Figure 1:
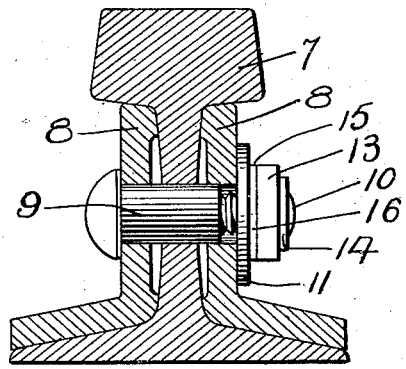

No. 874,773. PATENTED DEC. 24, 1907.
H. B. LAKE.
NUT LOCK.
APPLICATION FILED APR. 13, 1907.

Witnesses
Jesse C. Miller.
F. C. McCartney.

Inventor
H. B. Lake.
By Chandlee & Chandlee
Attorneys

THE NORRIS PETERS CO., WASHINGTON, D. C.

UNITED STATES PATENT OFFICE.

HERMAN B. LAKE, OF RAPID RIVER, MICHIGAN.

NUT-LOCK.

No. 874,773.  Specification of Letters Patent.  Patented Dec. 24, 1907.

Application filed April 13, 1907. Serial No. 367,966.

*To all whom it may concern:*

Be it known that I, HERMAN B. LAKE, a citizen of the United States, residing at Rapid River, in the county of Delta, State of Michigan, have invented certain new and useful Improvements in Nut-Locks; and I do hereby declare the following to be a full, clear, and exact description of the invention, such as will enable others skilled in the art to which it appertains to make and use the same.

The present invention relates to improvements in nut locks, and it aims to provide a simple, practical and effective device of that nature, by means of which a nut may be held in place upon a bolt, and, when tightened, be prevented from becoming loosened.

To this end, the invention, briefly described, consists of a plate carried upon the threaded end of the bolt, and provided with a corrugated outer face, a nut having the edges of its inner face provided with grooves extending from side to side, and a U-shaped key interposed between the plate and nut and consisting of a pair of arms fitting in opposite seats in the nut, and a bight portion fitting in a third seat and provided with a corrugated inner face engaged with the corrugations on the plate.

The invention will be readily understood from the following detailed description, and its preferred embodiment is shown in the accompanying drawings, in which like parts are designated by corresponding reference numerals in the several views.

Figure 2:
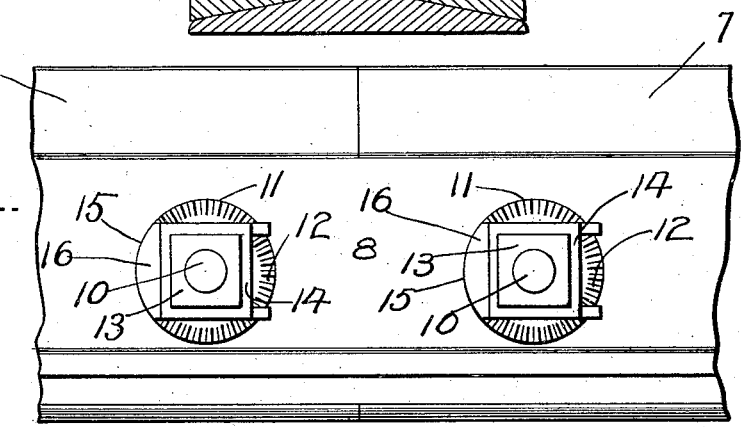
Figure 3:
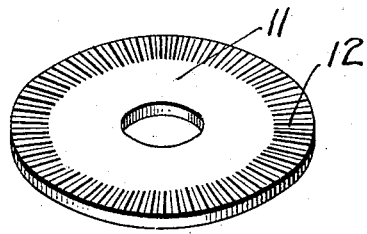
Figure 4:
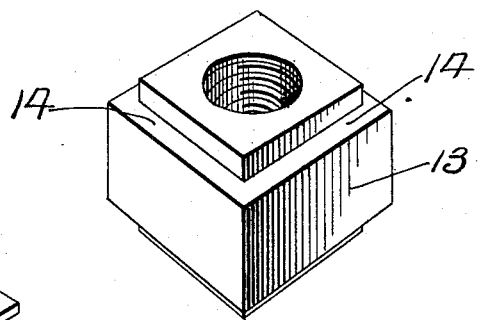
Figure 5:
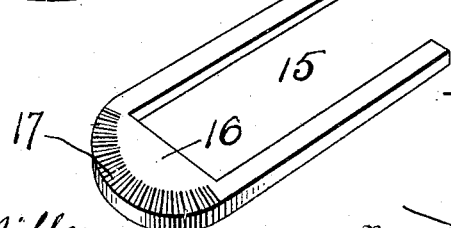

Of the said drawings—Figure 1 is a side elevation of the invention applied upon a bolt for clamping two fish-plates upon a track rail, the latter and the fish-plates being shown in cross-section. Fig. 2 is a front elevation of Fig. 1. Fig. 3 is a perspective view of the toothed plate carried by the bolt. Fig. 4 is a perspective view of the nut. Fig. 5 is an inverted perspective view of the locking key.

Referring more particularly to the drawings, 7 designates the rails, 8 the fish-plates, and 9 the bolts used in connection with the fish-plates and rails, each bolt being provided with a reduced threaded end 10. Carried by each bolt upon such end is a circular disk or plate 11, whose outer face is provided with a series of radiating teeth 12, disposed adjacent the periphery thereof. The nut 13, which is likewise fitted upon the threaded bolt end, has its opposite faces reduced so as to form seats 14 located on all four edges thereof, as shown, the seats extending from side to side.

Interposed between the plate and nut is a locking-key 15, formed of spring metal and approximately U-shaped, the bight portion 16, which connects the arms of said key being widened transversely and provided with a series of radially-extending teeth 17, which are formed on its inner face.

In operation the fish-plates are disposed in position on the rails, the bolts are passed through the rails and the fish-plates, and the plates 11 are then disposed upon the reduced threaded portions of the bolts. The nuts are then screwed on the bolts and tightened thereon. A locking-key 15 is then driven between each nut and the corresponding plate, the arms of the key fitting in the opposite seats 14 of the nut, and the bight portion 16 thereof in a third seat, the teeth 17 formed on the under face of the key locking with the teeth 12 formed on the outer face of the plate 11, the resilience of the metal of which the key is constructed permitting the portion 16 thereof to move slightly away from the plate until the two sets of teeth can interlock. Owing to the engagement between the teeth of the keys and plates, and to the tension of the key arms, it will be impossible to turn a nut thus fastened, thus preventing a nut once tightened upon a bolt from becoming loosened thereon. The length of each key is slightly greater than that of the diameter of the circular plate, and the distance between the inner faces of the key arms is slightly less than that between the inner walls of a pair of opposite seats 14, so that the arms, when in place therein, will be tensioned to a certain extent.

As above stated the resilience of the metal from which the key 15 is formed will permit the bight portion 16 thereof to move slightly away from the plate during the positioning of the key until the teeth formed upon the key and plate can interlock. This interlocking of the key and plate will prevent any rotation of the latter as the projecting ends of the arms will contact with the base of the fish-plate, the plate being held frictionally against the fish plate by the tightening of the nut 13.

While the device has been illustrated in connection with fish-plates and track-rails, it is to be understood that it is susceptible of general application.

What is claimed, is—

1. The combination, with a bolt having a threaded end, of a plate carried upon said bolt end, and provided with a corrugated outer face; a nut having the edges of its inner face provided with seats extending from side to side; and a U-shaped key interposed between said plate and nut, said key consisting of a pair of arms fitting in opposite seats in said nut and a bight portion fitting in a third seat therein and provided with a corrugated inner face engaged with the corrugations on said plate.

2. The combination, with a bolt having a threaded end, of a circular plate provided with a radially toothed outer face; a nut having the several edges of its inner face provided with seats extending from side to side; and a resilient U-shaped key interposed between said plate and nut, said key consisting of a pair of arms fitting in opposite seats in said nut, and a transversely widened bight portion fitting in a third seat therein and having a series of radially arranged teeth formed on its inner face for engagement with the toothed face of said plate.

In testimony whereof, I affix my signature, in presence of two witnesses.

HERMAN B. LAKE.

Witnesses:
    FRED E. DARLING,
    R. C. YOUNG.